Nov. 29, 1949    R. L. TRIMBLE    2,489,732
AUTOMATIC RESTAURANT EQUIPMENT
Filed Dec. 27, 1946    9 Sheets-Sheet 1

INVENTOR
Roy L. Trimble

Nov. 29, 1949  R. L. TRIMBLE  2,489,732
AUTOMATIC RESTAURANT EQUIPMENT
Filed Dec. 27, 1946  9 Sheets-Sheet 2

INVENTOR
Roy L. Trimble

Nov. 29, 1949  R. L. TRIMBLE  2,489,732
AUTOMATIC RESTAURANT EQUIPMENT
Filed Dec. 27, 1946  9 Sheets-Sheet 3

INVENTOR
Roy L. Trimble

Nov. 29, 1949 R. L. TRIMBLE 2,489,732
AUTOMATIC RESTAURANT EQUIPMENT
Filed Dec. 27, 1946 9 Sheets-Sheet 5

INVENTOR
Roy L. Trimble

Nov. 29, 1949         R. L. TRIMBLE         2,489,732
AUTOMATIC RESTAURANT EQUIPMENT

Filed Dec. 27, 1946         9 Sheets-Sheet 7

INVENTOR
Roy L. Trimble

Nov. 29, 1949     R. L. TRIMBLE     2,489,732
AUTOMATIC RESTAURANT EQUIPMENT Filed Dec. 27, 1946     9 Sheets-Sheet 8

INVENTOR
Roy L. Trimble
Wilkinson Huxley Byron & Knight

Fig. 19

Patented Nov. 29, 1949

2,489,732

UNITED STATES PATENT OFFICE 2,489,732

AUTOMATIC RESTAURANT EQUIPMENT

Roy Lane Trimble, Bloomington, Ill., assignor to Bloomington Manufacturing and Engineering Co., Inc., Bloomington, Ill., a corporation of Illinois Application December 27, 1946, Serial No. 718,689

21 Claims. (Cl. 186—1)

1

The invention relates to automatic conveyor systems for despatching articles from a central station to selected stations or destinations occurring at spaced intervals along the path of the conveyor and has reference more particularly to automatic restaurant equipment whereby the requirements of the customer will be executed economically and quickly and in a manner which will relieve the attendants of much of the work heretofore necessary in the serving of food.

The restaurant equipment as disclosed in the drawings provides a plurality of stations each having a seat for the customer and which stations are disposed along the path of a conveyor system embodying improvements of the invention. At each station the menu for the day is displayed from which the customer makes his selection by pressing selected buttons to close electrical circuits. These indicate his menu selections upon a master indicator located in the kitchen and his seat or station is also indicated by a light appearing on the master indicator. The attendant in the kitchen prepares the tray according to the menu selections as shown on the master indicator and the tray is then despatched to the station by said conveying system. With the present automatic equipment it is not necessary to use a special tray for a particular station since the stations are selected by novel timing means set into operation by the attendant at the time of despatching the loaded tray to the station.

An object of the invention resides in the provision of an automatic conveyor system for restaurant service which will embody improved means for propelling trays, which means will be economical in construction, positive in operation, and wherein the trays will be moved a definite distance for each revolution of the propelling means so that a predetermined spaced relation can be maintained between trays.

Another object of the invention resides in the provision of an automatic conveyor system for restaurant service which will embody improved ejecting mechanism for ejecting a loaded tray at a station and which mechanism will have operative association with timing means for controlling the despatch of a tray and for also controlling the ejecting operation.

A more particular object of the invention resides in the provision of a conveyor system for automatic restaurant service which will employ rotating spiral screws or helices as the propelling means for the tray, the said screws or helices being rotated at a definite and constant speed and the trays having coaction therewith whereby they are propelled in a manner for maintaining a predetermined spacing between trays.

Another object is to provide a restaurant conveyor system which will embody rotating spiral screws or helices as the propelling means for the

2 trays in combination with ejector means located at each station and which are driven from the rotating spiral screws so that during operation of the various parts a predetermined relationship is maintained between them.

Another and more specific object of the invention resides in the provision of a restaurant conveyor system which will embody improved means for starting the trays from the kitchen end of the conveyor system and which will start them in a manner to space the trays along the conveyor system, the said starting means having operative association with timing means for controlling both the starting operation and the ejecting operation and which will in effect time the travel of the trays on the conveyor system so that they are ejected at a selected station for which the timing means has been calibrated.

Another object resides in the provision of a conveyor system for restaurant service which will include a device at the end of the conveyor for lowering the trays and which will automatically place them on a return conveyor for propelling the used trays in a return direction to the kitchen.

Another and more specific object resides in the provision of a conveyor system as described having a lowering device at the end for lowering the trays and which will be substantially automatic in operation, wherein a tray may be deposited directly on the lowering device or held in position until the lowering device is able to receive the same, and which will then lower the tray and place the same on return conveying screws.

With these and other objects in view the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1:
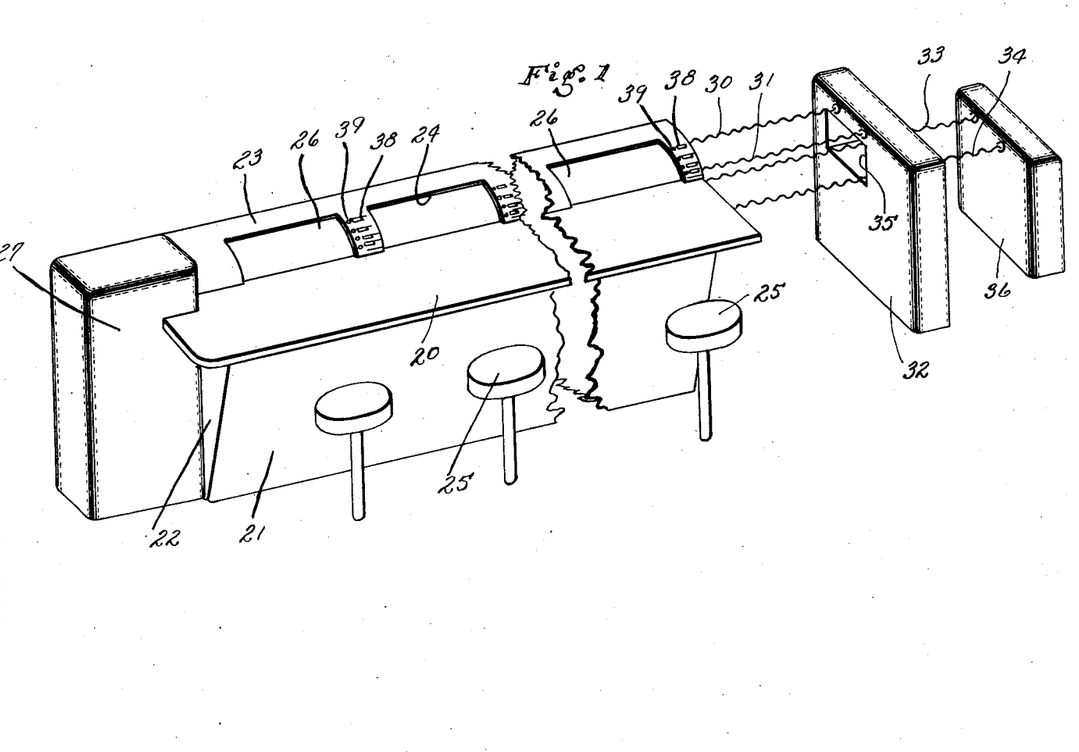
Figure 1 is a schematic perspective view showing an automatic restaurant installation as contemplated by the invention.

Referring to the drawings particularly Figure 1, the restaurant equipment selected for illustrating the present invention is schematically disclosed as including an elongated table or lunch counter 20 suitably supported by frame structure which includes the front panel member 21 and end members 22. The table 20 is associated with a conveyor system suitably housed within the arcuate top panel indicated by numeral 23, the top panel having openings 24 therein at spaced locations along the length of the conveyor system which define stations, each station being provided with a stool or seat 25 to be occupied by a customer. The openings 24 are normally closed by sliding doors 26 and which open automatically for the purpose of ejecting a loaded tray which is presented to the customer at said station. The doors 26 may also be opened manually, as will be presently described, by an attendant for the purpose of returning the tray and which is propelled by the conveyor to a lowering device suitably enclosed within housing 27. The said housing is constructed so as to have associated relation with the other parts of the equipment such as the table 20, and panel 22 and the top arcuate panel 23. Within housing 27 the lowering device functions to lower the used trays to return conveyor screws which return the trays to the kitchen.

Figures 2, 3:
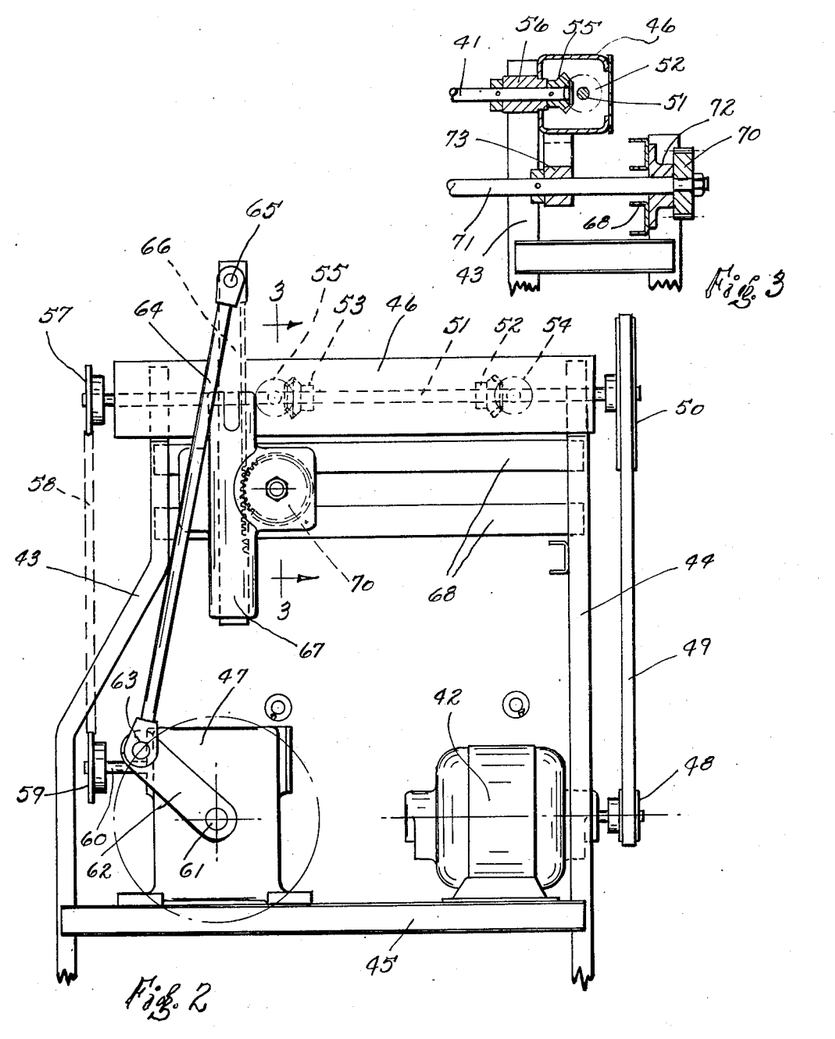
Figure 2 is a front elevational view showing the driving instrumentalities for the delivery conveyor of the restaurant installation as shown in Figure 1.
Figure 3 is a detail sectional view taken substantially along line 3—3 of Figure 2.

At the right hand end of Figure 1 the conveyor system of the invention is schematically illustrated as consisting of rotating spiral screws or helices 30 and 31, the same comprising the delivery conveyor and which are suitably supported at this end by the housing 32 which encloses the driving instrumentalities, as shown in Figure 2, for the screws of the delivery conveyor. At this kitchen end of the equipment the return conveyor screws are also schematically illustrated, the same being indicated by numerals 33 and 34, and it will be observed that these rotating spiral screws or helices pass through the rectangular opening 35 provided by housing 32 to extend beyond the same, which extending ends are suitably journalled by the housing 36 containing conventional driving mechanism, not shown, for rotating the said screws 33 and 34.

At each station the menu for the day is displayed as at 38 and from this menu the customer makes his selection for the meal desired by pressing corresponding buttons such as indicated by numeral 39. The buttons control electrical circuits which in turn indicate the selections upon a master indicator located in the kitchen and the seat or station is also indicated by a light appearing on the master indicator. The attendant in the kitchen prepares a tray according to the menu selections as shown on the master indicator and the tray is then placed on supporting means having association with the delivery conveyor. At the proper time, controlled by the timing means, the tray is despatched to the station and automatically ejected by ejecting mechanism. The rotating spiral screws for the delivery conveyor, the operating means therefor, and the ejecting mechanism will now be described.

Figure 19:
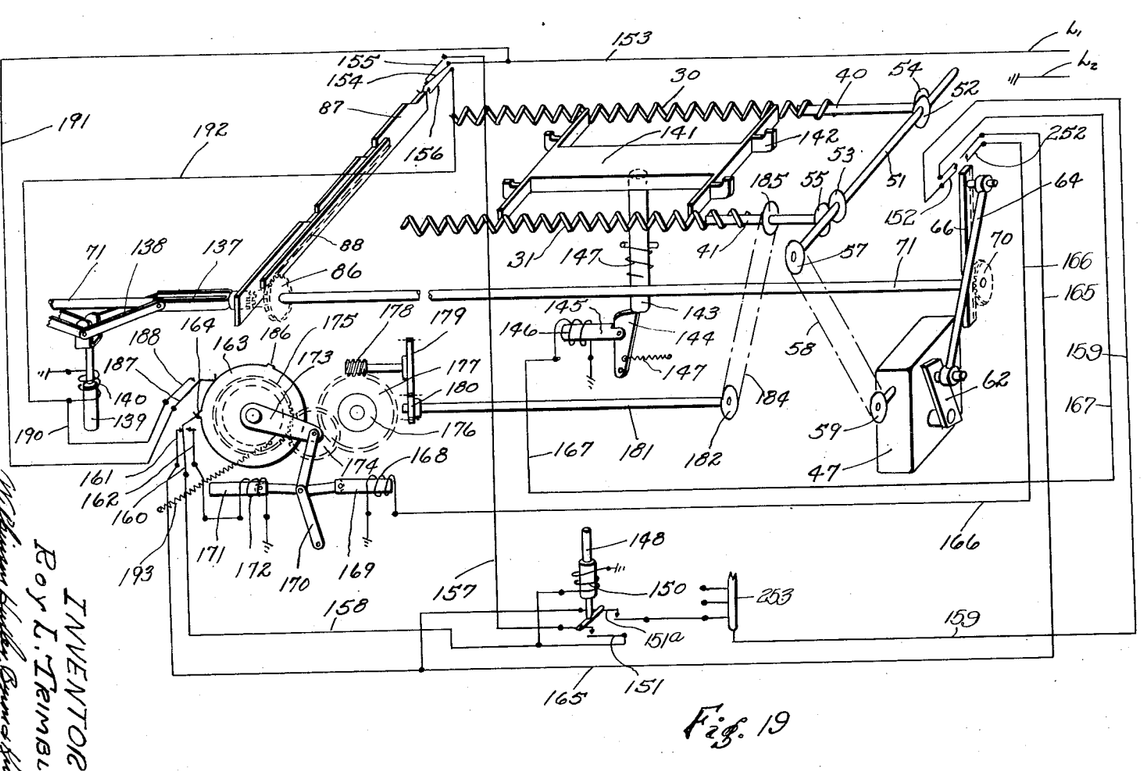
Figure 19 is another schematic wiring diagram illustrating the timing means which controls actuation of the start mechanism for the loaded trays and also the ejector mechanism.

The rotating spiral screws are best shown in Figure 19, wherein it will be observed that screw 30 comprises a left hand screw which is rotated in a clockwise direction; whereas, screw 31 is a right hand screw and is rotated in a counterclockwise direction. Each screw at the kitchen end has fixed relation with a shaft 40 and 41, respectively, which shafts are suitably journalled by the structure as shown in Figure 2 and driven from a source of power such as an electric motor 42. Although 30 has been illustrated as a left hand screw and 31 as a right hand screw, it is, of course, possible to reverse this arrangement, and the direction of rotation of the shafts 40 and 41. The supporting structure for journalling shafts 40 and 41 and the means for driving the same is shown in Figure 2, the same including uprights 43 and 44, a lower supporting platform 45 and a transversely extending gear box 46. The lower platform 45 supports the motor 42 and a housing 47 providing speed reducing mechanism. The shaft of the motor is equipped with a pulley 48 which receives the endless belt 49 operatively connecting at its other end with pulley 50 of somewhat larger diameter than 48. Pulley 50 is fixed to the drive shaft 51 journalled by and extending longitudinally of the gear box 46. The said shaft 51 is provided with bevel gears 52 and 53 which have meshing relation so as to drive similar bevel gears 54 and 55, the gear 55 being fixed to the end of shaft 40 as shown in Figure 3, which end of said shaft is suitably journaled by bearing 56. In a similar manner gear 54 is fixed to the end of shaft 40 and which shaft is also journalled at this end by structure similar to that shown in Figure 3. The drive from the motor thus takes place through belt 49 and the meshing bevel gears so that the spiral screws 30 and 31 are rotated in opposite directions at a speed controlled by that of motor 42.

At the end of drive shaft 51 a sprocket wheel 57 is located, the same having operative connection with chain 58 which in turn is connected with sprocket 59 fixed to the input shaft 60 of the speed reducing mechanism within housing 41. The output shaft 61 carries a crank arm 62 connecting at its end, as at 63, with the connecting rod 64. The upper end of the connecting rod is pivotally connected at 65 with a vertically reciprocating rack 66 mounted for movement within housing 67. The housing is suitably supported by the transverse channel members 68 having secured relation at their respective ends with the uprights 43 and 44. The gear 70 has meshing relation with rack 66 and is fixed to the end of the operating shaft 71 journalled by bearings 72 and 73, as shown in Figure 3.

The operating shaft 71 extends for the entire length of the delivery conveyor screws and provides the driving means for actuating the ejecting mechanism as will be understood from an inspection of Figure 19. A definite speed ratio exists between drive shaft 51 and the output shaft 61 which actuates crank arm 62 to reciprocate the crank 66. This speed ratio is preferably selected to suit the particular restaurant installation and may be considered, for example, as 24 to 1. In other words, drive shaft 51 rotates twenty-four revolutions to one revolution of output shaft 61. The spiral screws 30 and 31 are driven at the same speed as shaft 51 so that for every twenty-four revolutions of the spiral screws the rack 66 completes one cycle to rotate gear 70 and thus operating shaft 71 one revolution in one direction and then one revolution in an opposite direction. It will be assumed that the rack 66 starts its reciprocating cycle by moving downward, then the first half of the cycle results in rotation of shaft 71 in a counterclockwise direction, and the last half by rotation of said shaft 71 in a clockwise direction, Figures 2 and 19.

Figures 4, 5:
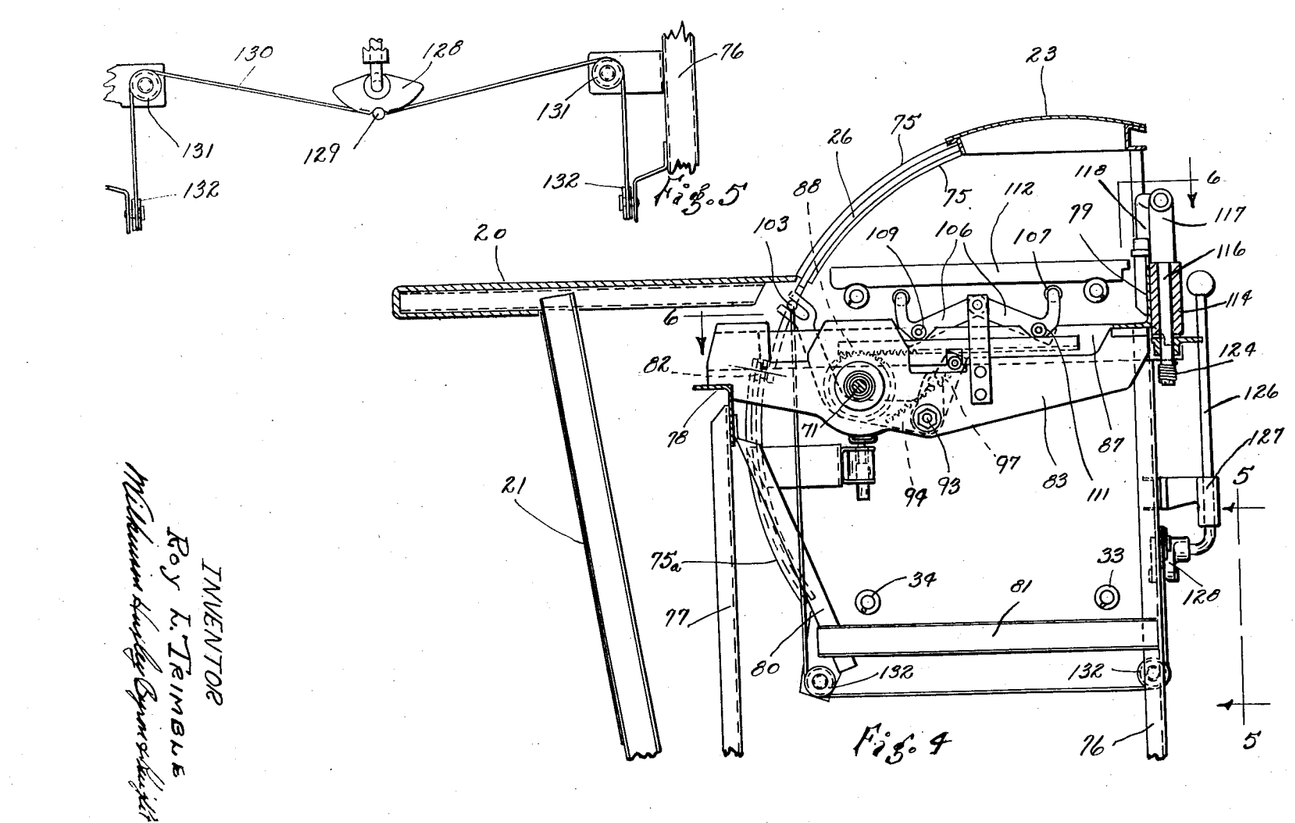
Figure 4 is a vertical sectional view through the conveyor system of the installation taken in advance of a station to show details of the ejector mechanism for the loaded trays.
Figure 5 is a fragmentary sectional view along line 5—5 of Figure 4.

The ejecting mechanism for automatically lifting a loaded tray from the delivery conveyor and ejecting the same to present the tray to the customer is disclosed in detail in Figures 4 to 12 inclusive. It will be understood that ejecting mechanism such as shown in these figures is provided at each station so that a tray may be ejected at the particular station for which the tray was prepared. In Figure 4 the table or lunch counter 20 is shown in section and which is suitably supported by the front panel 21. The top panel 23 is also shown in section and in connection with this disclosure it will be observed that the panel is provided with spaced guides 75 arcuate in form and which receive the slidable door 26 to thereby mount the door for its opening and closing movement.

Structural supports such as 76 are located rearwardly of the restaurant installation and these extend vertically to provide the required rear supports for the top panel 20. Similar structural supports 77 are located to the front of the installation adjacent the front panel 21 and which are connected along their top edge by the inverted L-shaped channel member 78. Referring again to member 76, it will be observed that an upright L-shaped member 79 has connecting relation therewith and these members, namely, 78 and 79, extend the length of the conveyor sytsem and form the supporting structure for the ejecting mechanisms. A diagonal strut 80 depends from member 78 and is tied to member 76 by the transverse beam 81, the structure providing adequate transverse bracing. Between adjacent diagonal struts 80 at each station there are located spaced guides 75a, Figures 4 and 6, having the same arcuate contour as the top guides 75. The lower guides 75a are adapted to receive a roller 82 carried by the door 26 centrally thereof and thus the door is guided during its opening and closing movements in addition to the guiding function performed by the main guides 75.

Figure 6:
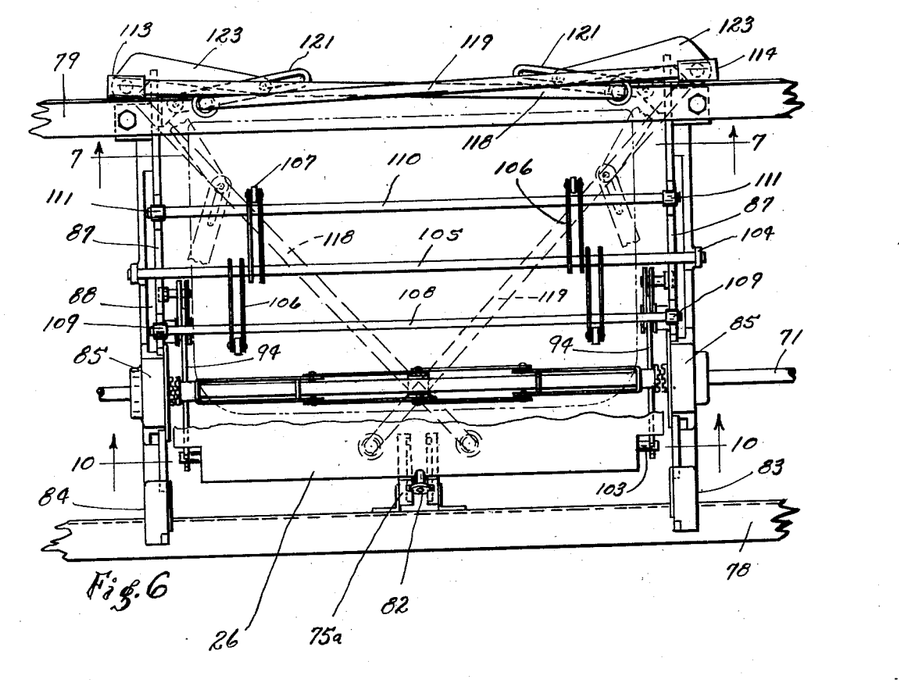
Figure 6 is a fragmentary sectional view taken on a horizontal plane substantially along line 6—6 of Figure 4 to illustrate the construction and operation of the ejector mechanism.

The members 78 and 79 at each station support a pair of castings 83 and 84, the casting 83 being located to the right hand end of its respective station, Figure 6, whereas, casting 84 is located to the left hand end. Member 79 supports its end of each casting, the same having depending relation therewith, whereas, the opposite end of each casting rests on member 78. Each of the castings 83 and 84 are provided with a hub portion 85 which journals a gear wheel 86, Figure 9, the said gear wheel being mounted for rotation on the operating shaft 71 independently thereof, it being understood that operative connection is effected between shaft 71 and the gear wheels 86 of any particular station only when it is desired to perform an ejecting operation upon a tray then located at the station. Each casting provides mounting means for a slide member 87 which is positioned immediately adjacent gear 86 and extends substantially the entire length of the casting, or, in other words, transversely of the conveyor structure. The slide member 87 is adapted to have reciprocating movement in a transverse direction and is slidably supported by its casting, the reciprocating movement being imparted to the slide by the rack 88 having meshing relation with the teeth on gear wheel 86 and which rack is fixedly secured to its slide member. When the gear 86 is operatively connected to shaft 71, rotation of the shaft in a counterclockwise direction will effect movement of the rack and slide member in an outward direction toward the left, Figures 4 and 8, and return rotation of shaft 71, or, in other words, rotation in a clockwise direction will return the rack and slide by imparting movement thereto in a direction toward the right. Each slide 87 is provided on its upper surface with a pair of notches 90 and 91 and at its extreme right hand end each slide carries a bracket 92 by means of which linkage may be pivotally connected to the slide. The notches are for effecting actuation of arms for lifting a tray, whereas, the bracket 92 effects actuation of arms for ejecting the tray, all of which will be presently described in detail.

Figure 8:
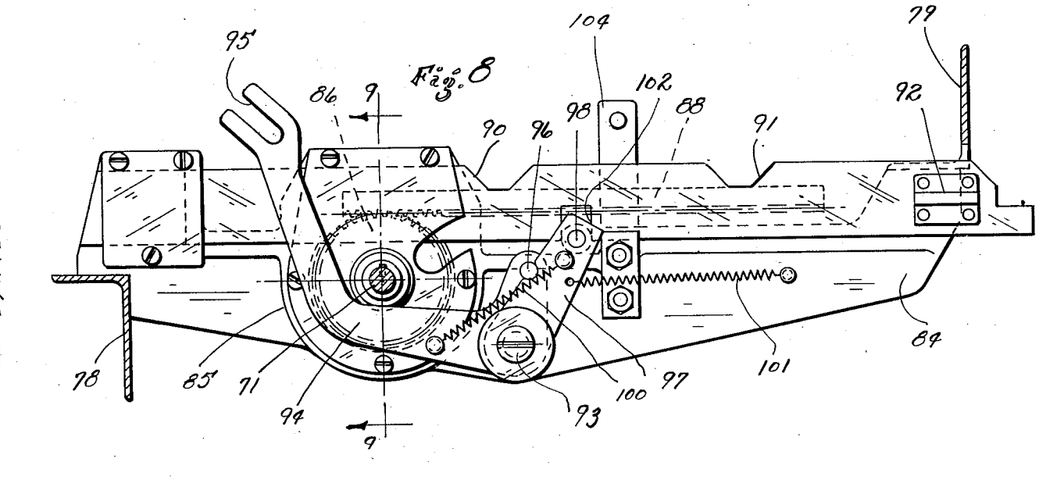
Figure 8 is a detail sectional view showing one of the rack and slide members located at each station for lifting a tray from the conveyor screws preparatory to ejecting the tray.

Before the tray can be ejected it is of course necessary for door 26 to be opened at the particular station for which the tray is intended. Each casting 83 and 84, as shown in Figures 6 and 8, is provided with a stud shaft 93 which functions to mount a door closing arm 94 substantially L-shaped in formation and having a bifurcated free end forming the slot 95. The opposite end of the door closing arm 94 projects a short distance above shaft 93 and this end is provided with a pin 96. A second arm 97 is also mounted on shaft 93, said arm having at its free end a pin 98. The arm 97 is resiliently connected to the door closing arm by the coil spring 100 which maintains the arm 97 in resilient contact with pin 96 and any movement imparted to arm 97 in a counterclockwise direction is positively transmitted to the door closing arm to cause said arm to also rotate in a counterclockwise direction. It will be understood, however, that it is possible for the door closing arm to rotate in this direction independently and without requiring similar movement of arm 97. The coil spring 101 has connection with arm 97 and said spring functions to yieldingly hold the arm in an inoperative position, as shown in Figure 8, which locates the slide 87, as shown, since it will be seen that pin 98 on the arm 97 rides within slot 102 formed in the slide member. The mechanism at each station thus provides door closing arms 94 having spaced relation with each other and being located to the respective sides of door 26. The arms are operatively connected with the door by pins 103 which ride within the bifurcated slots 95. Movement of the slide members 87 in an outward direction, that is, toward the left, Figures 4 and 8, will produce movement of their corresponding arms 97 and their door closing arms 94, which movement will be in a counterclockwise direction to produce opening of the door 26. During this opening movement the roller 82 at the lower end of said door will slide within the groove provided therefor by the guide member 75a. Return movement of the slide members, that is, movement in a direction toward the right, will produce clockwise rotation of the arms and thus effect a closing of the door.

A strap such as 104 is fixed to each casting so as to extend vertically thereof, and at its upper end the said straps are apertured for receiving and journalling a shaft 105, Figure 6. Such a shaft extends longitudinally of the conveyor system at each of the stations and between the castings 83 and 84 thereof. A plurality of lifting arms 106 are fixed to said shaft 105 in pairs, the said arms having the general shape of an L and carrying rollers 107 at their upwardly directed ends. Two pairs of arms 106 extend to the left of shaft 105, Figure 4, and these pairs, which are suitably spaced, are connected by a longitudinally extending rod 108. At the ends of said rod 108 rollers 109 are located which have location in slots 90 provided by the slide members, respectively, mounted for reciprocating movement in the castings. In a similar manner two pairs of arms 106 extend to the right of shaft 105, the same being suitably spaced and connected by the rod 110 which carries rollers 111 at its respective ends, having location in slots 91 provided by the slide members. It will be seen that rods 108 and 110 pass through the L-shaped arms 106 at the elbow thereof forming the lower junction of said arms. Transverse movement of the slide members will rock the arms 106 in an upward direction so that the rollers 107 engage the underside of the tray 112 to lift the tray from the spiral screws 30 and 31. This action takes place upon initial movement of the slide members in an outward direction toward the left, which movement also effects actuation of the door closing arms 94 to cause opening of door 26. The tray is now in a position to be ejected and the ejecting arms are presently actuated so that movement of the tray transversely of the conveyor system toward the customer is timed to take place when the door 26 is fully opened.

Figure 7:
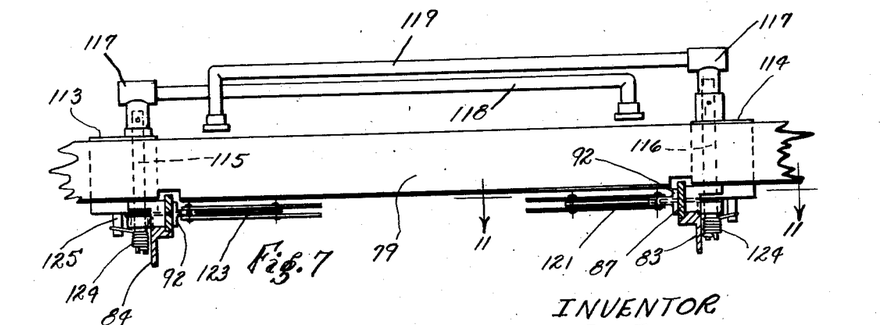
Figure 7 is a fragmentary sectional view taken along line 7—7 of Figure 6.
Figure 11:
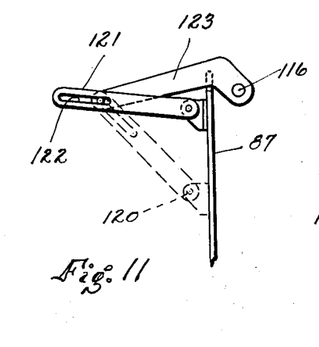
Figure 11 is a fragmentary view in plan taken along line 11—11 of Figure 7 and showing the linkage for effecting actuation of the ejecting arms for ejecting the trays.
Figure 12:
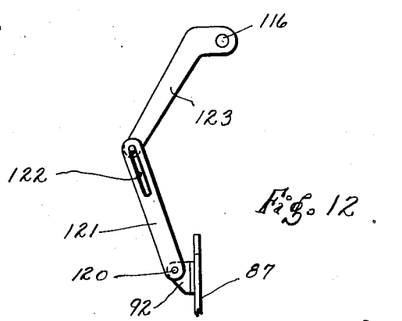
Figure 12 is a view similar to Figure 11 but showing the linkage in another position of operation.

The member 79 provides supporting means for the upright bearings 113 and 114, Figure 7, which bearings journal the vertical shafts 115 and 116, respectively. The upper end of each of the shafts 115 and 116 have fixedly secured thereto an elbow 117 to which are secured ejector arms 118 and 119. The arms are actuated to push tray 112 outwardly toward the customer or in a direction toward the left, Figures 4 and 6, by rotation of shafts 115 and 116 which is imparted thereto by their respective slide members 87. Each slide member carries at its right hand end a bracket 92, Figure 8, which has operative connection with linkage as shown in Figures 7, 11 and 12. The bracket 92 of each slide member is pivotally connected at 120 with a link 121 provided at its free end with an elongated slot 122. By means of this slot an arm 123 is operatively connected to a link 121. An arm 123 is fixedly secured to the depending lower end of shaft 115 and also 116 so that these shafts have simultaneous rotation upon sliding movement of slide members 87 and which is equal in extent. The slide members therefore function to actuate the ejecting arms 118 and 119, but in order to allow time for the slides to produce a full opening of the door 26 the links 121 are formed with the slot 122. Therefore initial movement of the slide members 87, which effects opening of the door 26 and lifting of tray 112, will not produce actuation of the ejector arms since the slots 122 in the linkage provide a lost motion connection and the ejector arms remain stationary until the last half of outward movement on the part of the slide members. It is this latter movement of the slide members which is effective to actuate arms 123 and thus the shafts 115 and 116 to move the ejector arms in an outward direction to thus eject a tray.

The depending end of each of the shafts 115 and 116 is provided with a coil spring 124, one end of which is fixedly secured to its respective shaft, whereas the other end is fixed to a stationary pin 125 depending from the member 79. Each coil spring tensions its respective ejector arm so that the arm in moving outwardly winds up the spring. Thus the arms are assisted in their return to an inoperative position. Also these springs 124 assist the coil spring 101 in returning the slide members to a position within their casting and which effects a closing of the door 26. When the slide members have been so located the slots 90 and 91 will again be positioned for receiving rollers 109 and 111 and as a result arms 106 will descend to an inoperative position below and in spaced relation with respect to any tray which may be supported on the spiral screws 30 and 31.

The door 26 must be opened for returning the tray to the conveyor system and thus means are provided, as shown in Figures 4 and 5, for opening and closing the door manually. It is only necessary for the operator to actuate the rod 126 by moving the same in a downward direction, the rod being suitably supported for vertical reciprocating movement by the bracket 127 and having fixedly secured to its lower depending end the notched member 128 carrying the transverse pin 129. Said pin is disposed over and in contact with cable 130 which passes over pulleys 131 and 132 to extend upwardly for connection with the pins 103 located to each side of door 26. It will be seen that downward movement of rod 126 will apply tension to cable 130, effecting actuation of door 26 in an opening direction. After the tray has been removed from the table 20 and returned to the conveyor screws the rod 126 can be elevated to permit the door to move upwardly into its original closed position.

Figure 9:
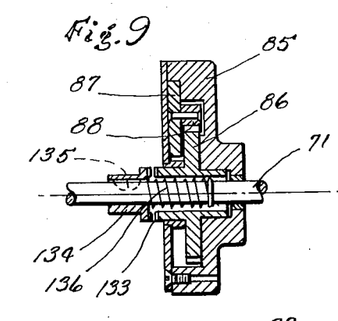
Figure 9 is a sectional view taken along line 9—9 of Figure 8.
Figures 10, 13:
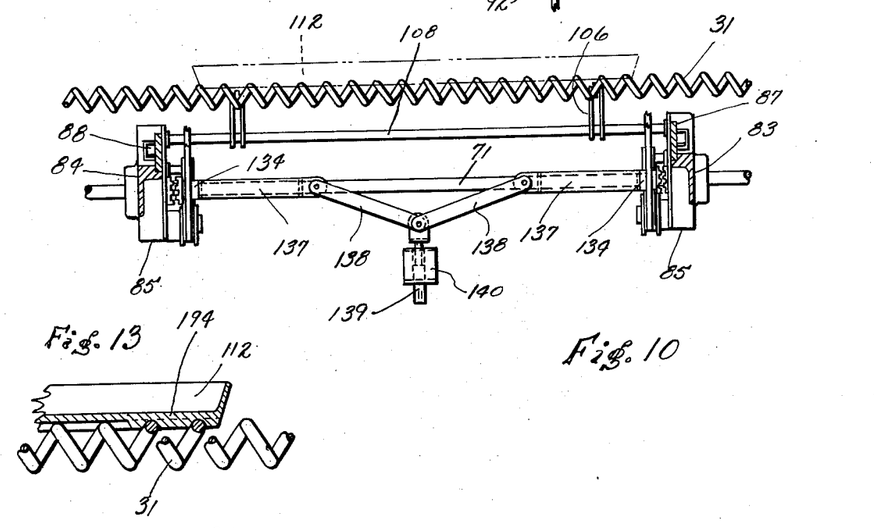
Figure 10 is a sectional view taken along line 10—10 of Figure 6 showing the solenoid and clutch structure actuated thereby for initiating operation of the ejector mechanism.
Figure 13 is a fragmentary sectional view taken longitudinally of the tray and showing the coaction between the tray and the spiral screws which rotate to propel the tray.

The mechanism for operatively connecting shaft 71 with the gear wheels 86 is shown in Figure 10, it being understood that said gear wheels are independently mounted on shaft 71, Figure 9, and that they have operative connection with shaft 71 only when it is desired to effect an ejecting operation. The hub of each gear wheel 86 is serrated as at 133 and this serrated end projects outwardly of its casting for coaction with a collar such as 134. Two collars are thus mounted on shaft 71 between the respective castings at each station, and it will be clear from Figure 9 that each collar is suitably keyed as at 135 to the shaft 71 so as to rotate with the shaft and which keyed arrangement permits slidable movement of the collar in a direction longitudinally of the shaft. The coil spring 136 normally functions to maintain the collar 134 in spaced relation with respect to the serrated hub of gear wheel 86. However, when the collars are caused to move in a direction toward the gear wheels, the serrated edges of the members interengage so that each gear wheel is driven by shaft 71. The collars are backed by slidable members 137 which do not rotate with shaft 71 but have slidable movement in a direction longitudinally of the shaft. Each member 137 is connected by links 138 to the armature 139 of the solenoid 140. When the solenoid is deenergized the armature depends a substantial distance below the same so that the members 137 are retracted, permitting the collars 134 to move out of engagement with their respective guide wheels. However, upon energization of solenoid 140 armature 139 is caused to move upwardly, whereupon members 137 move outwardly to actuate the collars and cause operative connection to take place between the gear wheels and shaft 71 so that as a result the slide members 87 are actuated for an ejecting operation. The solenoid 140 is energized when the tray 112 is centrally located at its station as shown in Figure 10. Timing means are provided for energizing the said solenoid and the construction and operation of said means will now be described.

Referring to Figure 19, the delivery conveyor system including the spiral screws 30 and 31 is provided with a tray loading station at the kitchen end of the conveyor and which is located immediately adjacent housing 32 which houses the driving mechanism for the said spiral screws. When a tray has been prepared in the kitchen the attendant places the tray on the support 141 provided with the upstanding lugs 142. The support is also provided with the standard 143 which in turn normally contacts the latch 144 and when in contact with said latch the support is so positioned that the tray carried thereby will be supported above the spiral screws 30 and 31. It is necessary, therefore, to remove the latch 144 from under standard 143 in order to allow the support 141 to descend and deposit the tray on the rotating screws. Latch 144 is actuated by armature 145 of the solenoid 146 and which is energized for the purpose of retracting the latch 144 and releasing the standard. When the latch is retracted the standard is supported in a resilient manner by the coil spring 147, and which has action to yieldingly bias the standard and support in an upward direction whereby the latch will automatically be positioned under the standard upon deenergization of solenoid 146. The latch is resiliently urged in a direction for locating the same under the standard by the coil spring 147.

For energizing solenoid 146 the push button 148 must be depressed to energize the solenoid 150 by closing switch 151 and it is also necessary for the switch 152 to be closed, which, however, is only momentarily closed by rack 66 when the rack reaches the top position of its stroke. It has been previously stated that this is the end position of the cycle or the position from which a new cycle is started by downward movement of the rack 66 to cause counterclockwise rotation of shaft 71. The loaded trays are therefore despatched from the tray loading station at those instances when the rack is at the top of its stroke and accordingly this part of the timing means has operation to space the trays. Based on the assumption previously given of a twenty-four to one ratio between the spiral screws 30 and 31 and the crank 62, it will be understood that a tray is despatched or released by the tray loading station every twenty-four revolutions of the spiral screws. Also for purposes of illustration it may be assumed that the pitch, that is, the distance between convolutions, is one inch, and based on this assumption, the trays will be spaced a distance of two feet. If the trays have a length of approximately eighteen inches, clearance of six inches will be provided between trays since it will be seen that for an ejecting operation twenty-four revolutions of the rotating screws are required to complete such an operation. This follows from the fact that shaft 71 completes one cycle of operations for each twenty-four revolutions of the spiral screws and for each cycle the shaft rotates a full revolution, first in a counterclockwise and then in a clockwise direction, which imparts to the slide members an outward movement for opening door 26, lifting the tray, and ejecting the same, and then a rearward movement for retracting all the parts to return them to initial position.

The electrical wiring for switches 151 and 152 is as follows: The power is supplied by lines $L_1$ and $L_2$, the latter being grounded and the former having connection through conductor 153 with movable switch member 154. Said switch member is disposed between stationary contacts 155 and 156 and is so positioned as to have contact with a slide member 87 corresponding to the station for which this particular wiring circuit is intended. Contact with slide member 87 maintains movable contact 154 in electrical connection with 155. Otherwise the movable contact would engage contact 156. However, with slide 87 in an inoperative position the circuit is closed through conductor 157 electrically connecting with solenoid 150 through switch 151. The other terminal of switch 151 is connected by means of conductor 158 with movable contact 160 having operative relation with the fixed contacts 161 and 162. The timing disc 163 provides a projection 164 which in normal position of the disc is so located as to contact movable member 160, causing engagement and electrical connection to be made with 161. Conductor 158 is thus normally connected to conductor 165 which leads to switch 252, also associated with the reciprocating rack 66. Conductor 166 of said switch 252 is electrically connected to solenoid 168, whereas, the two conductors of switch 152, namely, conductors 167 and 159, are electrically connected to solenoid 146 and the bus bar 253, respectively. The bus bar 253 has connection with switch 151a which is simultaneously closed with switch 151 by the actuation of button 148. With switches 151 and 151a in closed position, then when switch 152 is momentarily closed by rack 66, a circuit is established through solenoid 146, energizing the same to retract latch 144, dropping the support 141 and placing the loaded trays on the rotating spiral screws.

At the kitchen end of the conveyor system there is provided a plurality of push buttons such as 148, a button corresponding to each station provided by the restaurant installation. It is necessary for the operator to depress that button for which the tray place on support 141 is intended. Upon depressing button 148 it will remain depressed until the tray has reached its particular station, the said button being held in a down position by energization of solenoid 150, which remains energized during operating of the timing mechanism. The timing means for timing the travel of the tray along the conveyor system until it reaches its particular station and which controls actuation of the ejecting mechanism at that station will now be described.

Simultaneously with the energization of solenoid 146 the solenoid 168 is also energized and armature 169 is actuated to straighten the toggle formed of links 170. At the midpoint of the toggle the same is connected to armature 169 and also to armature 171 of solenoid 172. At its upper end the toggle is pivotally connected to crank 173, the parts rotatably journalling at said pivotal connection a combination friction and gear wheel 174. It will be seen that when the toggle mechanism is straightened the combination gear and friction wheel 174 is elevated, whereas, when the toggle assumes the position as shown in Figure 19 the said combination wheel assumes a lower inoperative position. The gear part of said combination wheel 174 has meshing relation at all times with a gear 175 fixed to and rotatable with the timing disc 163. The friction part of said combination wheel is adapted to contact a coacting friction wheel 176 when the wheel 174 is elevated. The latter wheel 176 is fixed to a gear wheel 177 and which is suitably journalled for rotation and driven by the meshing worm gear 178. The driving gear 179 is fixed to the opposite end of the shaft carrying the worm 178 and said driving gear is driven by pinion 180 on shaft 181 which carries at its other end the sprocket 182. The sprocket 182 is operatively connected by the endless chain 184 with sprocket 185 on shaft 41, which shaft forms part of the conveying mechanism having connection with the spiral screw 31.

The driving mechanism as above described for the timing disc 163 is such as to cause rotation of the gear 177 during operation of the conveyor screws. The timing disc 163, however, is not rotated until the toggle formed of the links 170 is straightened to locate the combination gear and friction wheel 174 in an elevated position, in which position the friction part of the combination wheel will engage the rotating friction wheel 176. Energization of solenoid 168 will therefore initiate rotation of the timing disc 163 and it will be understood that this action takes place simultaneously with the release of support 141 at the tray loading station to place a loaded tray on the conveyor screws. The button 148 and the timing disc 163 and associated mechanism constitute the timing means for a particular station, it being understood that similar mechanism is provided for each station of the conveyor system. The location of the projection 186 on the timing disc 163 is thus determined by the particular station for which the timing mechanism is intended. Initial rotation of the disc 163 which takes place in a counterclockwise direction will move projection 164 out of contact with the movable switch contact 160 so that electrical connection with 161 is broken and connection with 162 is made. This action takes place approximately simultaneously with the opening of switch 152 by reason of rack 66 moving downwardly. Opening of switch 152 will break the circuit to solenoid 168, deenergizing this solenoid, and in order to maintain the toggle in a straightened operative position it is necessary to energize solenoid 172 and such energization automatically takes place when electrical contact is made between 160 and 162.

Rotation of the timing disc 163 continues in a counterclockwise direction and the action of this disc is to time the movement of the tray on the conveyor screws. When the tray reaches the particular station for which it is intended the projection 186 will engage the movable contact 187, actuating the same outwardly to effect electrical connection with contact 188. The solenoid 140 is thus energized since the solenoid is grounded at one terminal and connected at its other terminal by conductor 190 with contacts 188 and 187, and by conductor 191 with conductor 153. The conductor end 190 of the solenoid is also connected by conductor 192 with contact 156. When the solenoid is energized the gear wheels 86 are operatively connected with shaft 71 and actuation is imparted to the slide members 87 in a manner as has been described to perform an ejecting operation. The eating stations are so located with respect to the tray loading station that an ejecting operation is initiated at the start of a cycle of shaft 71, or, in other words, at the start of downward movement of rack 66. It is necessary for shaft 71 to have initial rotation in a counterclockwise direction in order to move slide members 87 outwardly. Movement outwardly of the slide members will release movable contact 154 so that the contact drops to engage 156. The action is two-fold. In the first place, the circuit to solenoid 172 is broken and since both solenoids, namely, 168 and 172, are deenergized the toggle will return to an inoperative position, rendering the combination gear and friction wheel 174 inoperative and driving of the timing disc 163 stops. Secondly, closing of switch contacts 154 and 156 will close the electrical circuit through conductor 192 to solenoid 140 and thus the solenoid remains energized even though the movable switch contact 187 may move out of engagement with contact 188. Such action takes place immediately upon discontinuance of the drive to the timing disc 163 and it will be seen that the disc is resiliently returned to initial position by action of the coil spring 193. The breaking of the electrical circuit at contacts 154 and 155 has the effect of not only deenergizing solenoid 172 but also solenoid 150, so that the push button 148 returns to its initial position. Upon the slide members returning to their initial position it will be seen that the movable contact 154 is lifted to break the circuit through 156 and thus the solenoid 140 is deenergized.

Figure 14:
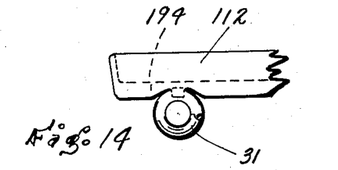
Figure 14 is a fragmentary rear elevational view of a tray further illustrating the coaction between the tray and the spiral propelling screws.

Before describing the means for lowering the used trays to place them on a return conveyor it is necessary to understand how the trays coact with the propelling screws so that the trays are moved along the conveyors. Reference is made to Figures 13 and 14 wherein it will be seen that the tray 112 is provided with a rear portion 194 of considerable thickness and which is grooved on the undersurface so as to receive the convolutions of the conveyor screws. As the screws rotate the tray is caused to move in a direction parallel to the said screws.

Figure 15:
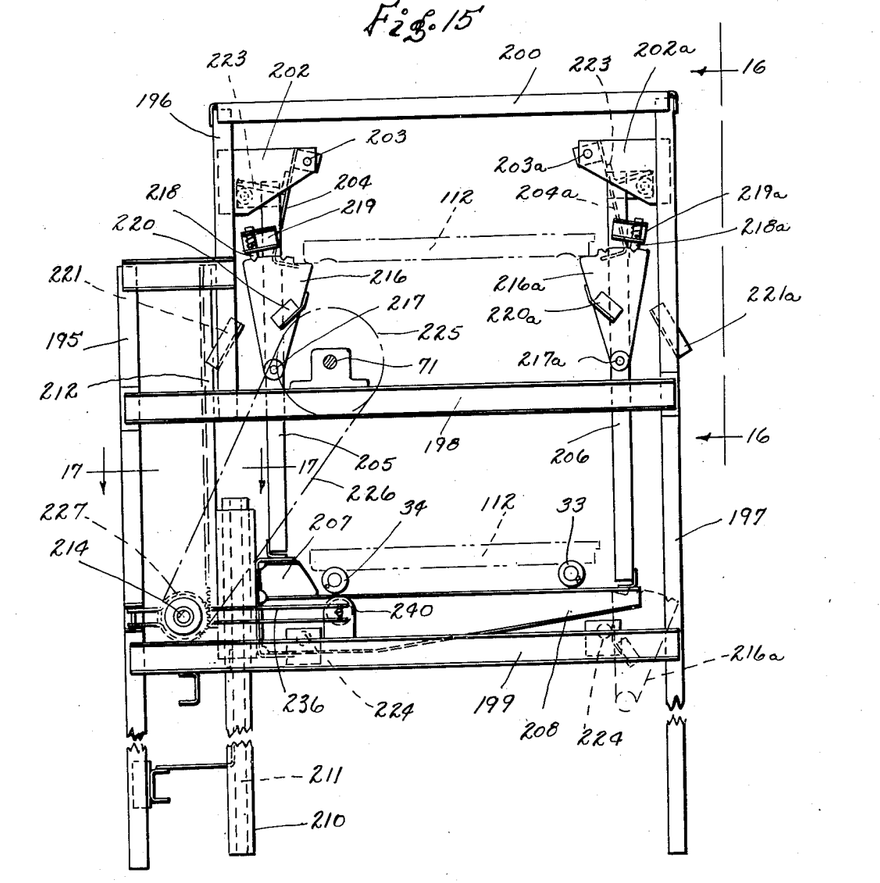
Figure 15 is a vertical sectional view illustrating structural details of the elevator device for lowering the used tray to the return conveyor.
Figure 16:
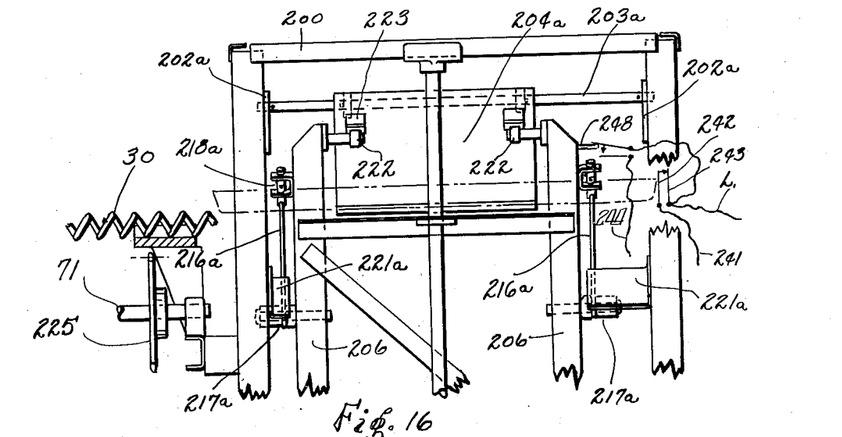
Figure 16 is a fragmentary side elevational view taken substantially along line 16—16 of Figure 15.
Figure 17:
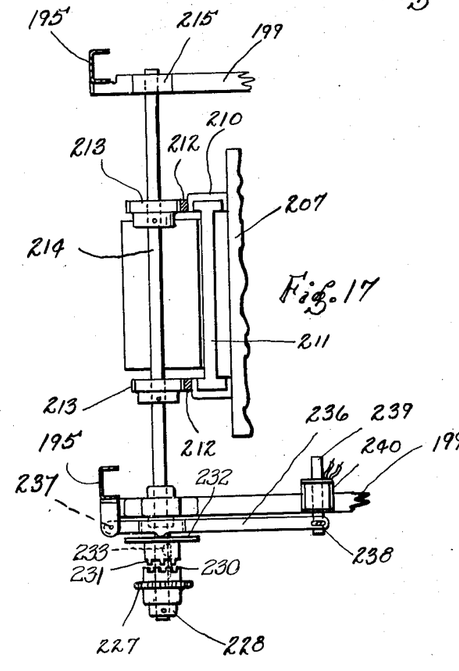
Figure 17 is a horizontal sectional view illustrating the driving means for reciprocating the elevator device.

The mechanism for receiving and lowering the used trays is shown in Figures 15 to 17 inclusive wherein conventional frame structure is disclosed comprising front standards 195 and 196 and rear standards 197 and which are connected transversely and longitudinally of the conveyor structure by intermediate members 198 and 199 and top struts 200. The position of the lowering mechanism at the end of the conveyor system is such that the delivery screws 30 and 31 terminate immediately adjacent the structure, whereas the return conveyor screws extend within the structure so that a tray may be deposited directly on said screws.

Plates 202 are secured to the upper section of the front uprights 196 and similar plates 202a are secured to the upper portion of the rear uprights 197, each set of plates journalling a shaft 203 and 203a, respectively, which extend in a direction longitudinally of the conveyor system. Intermediate the ends of each shaft there is suitably fixed a tray supporting plate 204. Each plate has the general shape of an L with the lower horizontal flange of each plate being directed inwardly toward each other and therefore being adapted to engage with and support a tray 112 which may be located within the space between the plates. This action of the tray supporting plates is due to the fact that they are so pivoted by the shaft 203 as to depend with their lower flange directed inwardly and they automatically engage with the tray upon the same being propelled between the plates by the delivery conveyor screws 30 and 31.

The actual device for lowering the used trays essentially consists of standards 205 and 206, there being two standards 205 positioned longitudinally in spaced relation and which are spaced from two corresponding standards 206 so that an area is encompassed by the four standards corresponding to but somewhat larger than the rectangular area of a tray. The standards 205 at their lower end are fixed to support 207, whereas the standards 206 at their lower end are fixed to support 208. In Figure 17 it will be seen that the supports are carried by a yoke 210, being slidably mounted on a frame 211 so as to permit vertical reciprocating movements of the yoke. At each end the yoke 210 has suitably secured thereto a rack 212, each rack meshing with a gear wheel 213 fixed to and rotated by the drive shaft 214. At its ends the shaft is journalled in bearings 215 supported by the intermediate members 199. Rotation of shaft 214 takes place for a full revolution, first in a counterclockwise direction, and then in a clockwise direction, since the shaft is driven from shaft 71. As a result the racks 212 are reciprocated to produce vertical reciprocating movement of yoke 210, the supports 207 and 208 and the standards 205 and 206. The standards 205 each carry adjacent their upper ends a pivoted tray supporting member 216, the same being pivoted to its respective standard as at 217 and having a plurality of notches formed in its top arcuate surface. A spring energized detent 218 is adapted to engage in one of the notches to thereby position the member 216, the detent being suitably supported above the member by a frame 219 which is fixed to its respective standard 205. Each member has a cam plate 220 also fixed thereto substantially intermediate of its length, the purpose of which will be presently described, and a stationary cam plate 221 is suitably supported by the upper section of each upright 193 in alignment with a plate 216. Referring to standards 206, it will be seen that each standard is likewise provided with a tray supporting member 216a and which is pivotally secured to its standard as at 217a, the upper end of each member having a number of notches formed therein and which are adapted to receive the detent 218a suitably supported above the member by frame 219a which is fixed to its respective standard. A cam plate 220a is fixed to member 216a and the rear uprights 197 are each provided with a stationary cam plate 221a.

It will be seen from Figures 15 and 16 that the stationary camming plates 221 and 221a are located in the path of the members 216 and 216a, respectively, so that when these members move vertically with elevating movement of their respective standards they will be caused to contact the stationary camming plates. The said camming plates are so positioned that contact between them and the members 216 and 216a will move the members inwardly, in which position they are held by the detents 218 and 218a. When the tray supporting members are positioned inwardly, as shown in Figure 15, they will support a tray 112 as shown. Means are provided at the extreme upper ends of the standards for moving the plates 204 and 204a into a released inoperative position when members 216 and 216a are positioned to engage and support a tray. This structure is clearly shown in Figure 16, the same consisting of rollers 222 fixed to and located inwardly from the standards 205 and 206. The rollers 222 are adapted to contact a rear flange 223 fixed to and extending from the rear surface of each of the plates 204 and 204a and as a result of this contact the said tray supporting plates are moved into a released inoperative position and are held in this position as long as the lowering mechanism remains in its up position. When the lowering mechanism moves downwardly any tray which may be supported by the members 216 and 216a will be carried with the same into a lowered position. This movement will initially release the plates 204 and 204a so that they will swing inwardly into an operative position and any tray which may be positioned between the same during the time the lowering mechanism is in a down position will be temporarily supported by these plates. The members 216 and 216a in moving downwardly will pass the fixed camming plates 221 and 221a and upon reaching their lowermost position they will have deposited on the return conveyor screws 33 and 34 the said tray 112. Just before the tray supporting members reach their lowermost position the camming plates 220 and 220a are caused to contact pins 224 which cam the members in an outward direction, in which position the members are held by the detents 218 and 218a which engage in a notch provided therefor in the top surface of the members. This outward movement of the members is necessary so that upon upward travel of the lowering mechanism the members will not contact the tray 112 which by this time has begun its movement in a rearward direction toward the kitchen. However, this outward position of the members is maintained only until they reach the fixed camming plates 221 and 221a which function to cam the members into an inward position, in which position the members will support a tray between them.

The elevating mechanism is operated from shaft 71. It would be possible to drive shaft 214 directly and continuously from said shaft 71, which would effect continuous operation of the lowering mechanism during the time the conveyor system is operating. Such operation of the lowering mechanism would lower any tray presented thereto by the delivery conveyor screws, although in actual practice the lowering mechanism would make many unnecessary trips. To eliminate these unnecessary trips and thus to produce operation of the lowering mechanism only at those times when a tray is in position to be lowered, the invention provides driving means capable of selective actuation. The sprocket 225, fixed to shaft 71, Figures 15 and 16, is operatively connected by the endless chain 226 with sprocket 227 suitably mounted on the projecting end of shaft 214. The sprocket is retained on the shaft by collar 228, located adjacent the end of the shaft. The hub of said sprocket on one end is provided with teeth 230 which coact with teeth 231 on the hub of control disc 232 also mounted on shaft 214. Said disc is keyed at 233 and thus the disc rotates with the shaft, the key-way slot, however, permitting axial movement of the disc to effect engagement and disengagement of the teeth 231 with teeth 230. It will be seen that collar 232 is associated with the lever 236 pivoted at 237 to the frame and having its other end operatively connected at 238 with the plunger 239 of solenoid 240.

Figure 18:
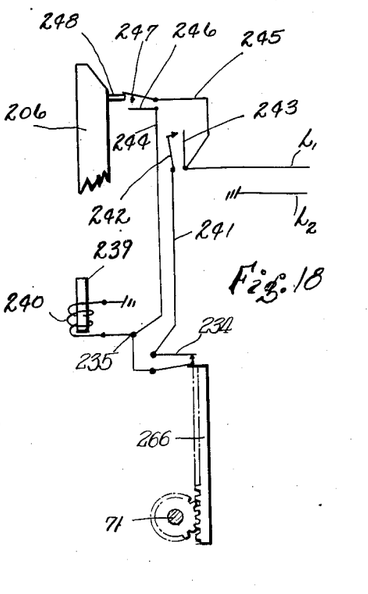
Figure 18 is a schematic wiring diagram for controlling operation of the elevator device.

The teeth of sprockets 225 and 227 have the same pitch diameter and said sprocket 225 has a pitch circumference equal to the reciprocating movement in one direction of the racks 212 which actuate the tray lowering elements. Thus substantially one revolution of shaft 71 and sprocket 225 is necessary to produce full travel of the tray lowering device in one direction. The solenoid 240 is energized when switches 242 and 234 are closed. Said switch 242 is closed by a tray when properly located within the device and in position to be lowered. The switch 234 is closed momentarily by the rack 266, which may be the same as rack 66, or another member having reciprocating movement similar thereto. When these two conditions are fulfilled the lever 236 is actuated to cause engagement with the sprocket 227 and shaft 214 is rotated in a direction to drive the racks 212 downwardly so that the lowering mechanism will lower the tray onto the return conveyor screws 33 and 34 in a manner as has been described. Upon rotation of shaft 71 in a counterclockwise direction it immediately reverses and repeats the movement in a reverse direction, that is, clockwise. The operative connection between sprocket 227 and driving disc 230 is maintained by energization of solenoid 240, by means such as shown in Figure 18.

Referring to said figure, it will be seen that one end of the solenoid is grounded and its other end is connected by the movable switch 234 and by conductor 241 to the movable switch contact 242. The stationary switch contact 243 is electrically connected to L₁, the other terminal L₂ being grounded. The switch formed by contacts 242 and 243 is provided with an interlocking circuit including conductors 244 and 245, the former having electrical connection at one end at 235 with solenoid 240 and at its other end with fixed contact 246, and the latter connecting with the movable contact 247. The switch formed by contacts 246 and 247 is automatically closed by gravity action of the movable contact toward the fixed contact. However, standard 206 carries a pin 248 adapted to engage the movable contact 247 when the lowering mechanism is in up position so that the said switch is thus maintained open by the pin. When a tray has engaged movable switch contact 242, causing the same to close, the solenoid 240 is energized, providing the switch 234 is also in closed position, which, of course, is momentary when the rack 266 reached the top position in its up travel. The solenoid remains energized even though switch 234 is immediately broken by down movement of the rack and switch 242 is also caused to open, since switch contact 247 of the interlocking circuit is closed. The circuit to the solenoid is automatically broken when pin 248 again reaches its up position, provided, of course that in the mean time another tray has not been positioned within the lowering mechanism.

The restaurant equipment herein described is unique and has improved operation by reason of the rotating spiral screws of the delivery conveyor system, which screws propel the trays a certain distance for a definite number of revolutions of the screws, depending on their pitch. It is therefore possible to maintain accurate spacing of the trays and to also drive the ejecting mechanism and the timing means from the rotating spiral screws so as to maintain a predetermined speed relation therewith. The travel of the trays from the tray loading station to a particularly ejecting mechanism is indicated by a comparative movement of the timing disc corresponding to the said mechanism and which disc is rotated a definite angular distance for the particular number of revolutions of the spiral screws required for this travel of the tray. It is therefore relatively easy to calibrate each timing disc, and in operation the said timing means are accurate and positive in controlling energization of the various solenoids 140 to initiate an ejecting operation. The ejecting of a tray is also performed at a definite speed relation with the rotating spiral screws of the delivery conveyor. This results from the manner in which the shaft 71 is driven, the shaft completing one revolution either in a clockwise or counter-clockwise direction for each stroke of rack 66. Since the rack completes one stroke for a definite number of revolutions of the spiral screws this relationship is employed in controlling the despatching of the trays at the tray loading station and thus the trays are propelled along by the spiral screws in desired spaced relation and which allows the ejecting mechanism at any particular station to complete its operation before a succeeding tray reaches the station, thus preventing interference at the stations during such operations.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In automatic restaurant equipment, the combination with an elongated lunch table, of a delivery conveyor for moving trays in one direction along the table, said conveyor including a pair of rotating spiral screws of a predetermined constant pitch throughout their length, a housing for said delivery conveyor having a plurality of openings adjacent the lunch table, a door for closing each opening, ejecting mechanism located at each opening for ejecting a tray, each mechanism operating to substantially simultaneously lift a tray from the rotating spiral screws and open the door at its respective openings, and means driving said ejecting mechanisms from the rotating spiral screws and at a predetermined speed ration therewith, whereby a definite number of revolutions of the screws are necessary for producing an ejecting operation.

2. In automatic restaurant equipment, the combination with an elongated lunch table, of a delivery conveyor for moving trays in one direction along the table, said conveyor including a pair of rotating spiral screws of a predetermined constant pitch throughout their length, a housing for said delivery conveyor having a plurality of openings adjacent the lunch table, a door for closing each opening, ejecting mechanism located at each opening for ejecting a tray, each mechanism operating to lift a tray from the rotating spiral screws, open the door at its respective opening and eject a tray through said opening by moving the tray transversely of the delivery conveyor, and means for driving said ejecting mechanism from the rotating spiral screws.

3. In automatic restaurant equipment, in combination, a delivery conveyor for moving trays in one direction, said conveyor including a pair of elongated spiral screws spaced horizontally from each other and mounted for rotation, means for rotating the screws, a housing for said delivery conveyor having a plurality of openings providing stations along the length of the conveyor, a door for closing each opening, ejecting mechanism located at each opening for ejecting a tray, and operating means for the ejecting mechanisms having driving relation with the spiral screws, said operating means including an operating shaft extending in a direction parallel to and for the length of the conveyor and at least one reciprocating slide member for each station having a geared relation with the operating shaft.

4. Automatic restaurant equipment as defined by claim 3, additionally including a return conveyor located below and parallel to the delivery conveyor for moving trays in a return direction, said return conveyor comprising a pair of elongated spiral screws spaced horizontally from each other and mounted for rotation, and lowering mechanism located at one end of said conveyors and adapted to receive trays directly from the delivery conveyor and deposit said trays upon the return conveyor.

5. Automatic restaurant equipment as defined by claim 3, wherein the ejecting mechanism at each station includes means for lifting a tray from the delivery conveyor, means for opening the door at said station and other means for ejecting the lifted tray, and wherein the reciprocating slide member for said station effects substantially simultaneous actuation of the tray lifting means and the means for opening the door.

6. In automatic restaurant equipment, in combination, a delivery conveyor for moving trays in one direction, said conveyor including a pair of elongated spiral screws spaced horizontally from each other and mounted for rotation, means for rotating the screws at the same speed, a housing for said delivery conveyor having a plurality of openings providing stations along the length of the conveyor, a door for closing each opening, ejecting mechanism located at each opening for ejecting a tray, a tray loading member located at the starting end of the delivery conveyor, operating means for the ejecting mechanisms including an operating shaft extending in a direction parallel to and for the length of the conveyor, and timing means for each said ejecting mechanism for indicating the travel of a tray from the loading member to the mechanism respectively, said operating shaft and each timing means having a geared relation with the spiral screws.

7. In automatic restaurant equipment, in combination, a delivery conveyor for moving trays in one direction, said conveyor including a pair of elongated spiral screws spaced horizontally from each other and mounted for rotation, means for rotating the screws at the same speed, a housing for said delivery conveyor having a plurality of openings providing stations along the length of the conveyor, a door for closing each opening, ejecting mechanism located at each opening for ejecting a tray, a tray loading member located at the starting end of the delivery conveyor, said loading member normally supporting a tray out of contact with the spiral screws but depositing said tray on the screws when released, operating means for ejecting mechanisms including an operating shaft extending in a direction parallel to and for the length of the conveyor, reciprocating rack means for rotating the operating shaft, and electrical means adapted to be energized by the reciprocating rack means at a predetermined point in its cycle of movement for effecting release of the tray loading member.

8. In automatic restaurant equipment, in combination, a delivery conveyor for moving trays in one direction, said conveyor including a pair of elongated spiral screws spaced horizontally from each other and mounted for rotation, means for rotating the screws, a housing for said delivery conveyor having a plurality of spaced openings providing stations along the length of the conveyor, a slidable door for closing each opening, an operating shaft extending the length of the conveyor and having rotation first in one direction and then in an opposite direction each for substantially one revolution, at least one slide member at each station supported for slidable movement transversely of the conveyor, rack means for operatively connecting the slide member with said operating shaft whereby the slide member may be reciprocated, elevating means actuated by reciprocating movement of the slide member for lifting a tray from the delivery conveyor, and ejecting means also actuated by movement of the slide member for moving a lifted tray transversely of the conveyor.

9. In automatic restaurant equipment, in combination, a delivery conveyor for moving trays in one direction, said conveyor including a pair of elongated spiral screws spaced horizontally from each other and mounted for rotation, means for rotating the screws at the same speed, a housing for said delivery conveyor having a plurality of spaced openings providing stations along the length of the conveyor, a slidable door for closing each opening, an operating shaft extending the length of the conveyor and having rotation first in one direction and then in an opposite direction each for a full revolution, at least one slide member at each station supported for slidable movement transversely of the conveyor, rack means for operatively connecting the slide member with said operating shaft whereby the slide member may be reciprocated, elevating means actuated by initial reciprocation of the slide member in one direction for lifting a tray from the delivery conveyor, a lever also actuated by initial reciprocation of the slide member in said direction for opening the door at the respective station, and ejecting means also actuated by movement of the slide member in said direction for moving a lifted tray transversely of the conveyor.

10. In automatic restaurant equipment, in combination, a delivery conveyor for moving trays in one direction and including a pair of horizontally spaced spiral screws adapted to be rotated at the same speed, a housing for said delivery conveyor having a plurality of spaced openings providing stations along the length of the conveyor, an operating shaft extending the length of the conveyor and having rotation first in one direction and then in an opposite direction each for a full revolution, a pair of spaced slide members at each station supported for slidable movement transversely of the conveyor, a rack fixed to each slide member, a gear wheel having meshing relation with each rack and being rotatably mounted on the operating shaft, means in associated relation with each gear wheel for operatively connecting the gear wheel to the operating shaft, whereby to cause actuation of the rack and reciprocating movement of the slide member, said means normally having inoperative released positions, and electrical means for actuating said last mentioned means into operative positions in engagement with their respective gear wheel upon energization of said electrical means.

11. In automatic restaurant equipment, in combination, a delivery conveyor for moving trays in one direction and including a pair of horizontally spaced spiral screws adapted to be rotated at the same speed, a housing for said delivery conveyor having a plurality of spaced openings providing stations along the length of the conveyor, an operating shaft extending the length of the conveyor and having rotation first in one direction and then in an opposite direction, each for a full revolution, a pair of spaced slide members at each station supported for slidable movement transversely of the conveyor, elevating means actuated by movement of the slide members in one direction for lifting a tray from the conveyor, ejecting means also actuated by movement of the slide members in said direction for ejecting a lifted tray, a rack fixed to each slide member, a gear wheel having meshing relation with each rack and being rotatably mounted on the operating shaft, means in associated relation with each gear wheel for operatively connecting the gear wheel to the operating shaft, whereby to cause actuation of the rack and reciprocating movement of the slide members, said means normally having inoperative released positions, and electrical means for actuating said last mentioned means into operative positions in engagement with their respective gear wheel upon energization of said electrical means.

12. In automatic restaurant equipment, in combination, a delivery conveyor for moving trays in one direction and including a pair of horizontally spaced spiral screws mounted for rotation, means for rotating the screws at the same speed, a housing for said delivery conveyor having a plurality of spaced openings providing stations along the length of the conveyor, ejecting mechanism at each station for lifting a tray from the delivery conveyor and ejecting the lifted tray through the opening corresponding to the station by moving the tray transversely of the conveyor, electric means in associated relation with each ejecting mechanism for controlling operation of the mechanisms respectively, and a timing device for each station for controlling the energization of the electric means corresponding to its particular station.

13. In automatic restaurant equipment, in combination, a delivery conveyor for moving trays in one direction and including a pair of horizontally spaced spiral screws mounted for rotation, means for rotating the screws at the same speed, a housing for said delivery conveyor having a plurality of spaced openings providing stations along the length of the conveyor, ejecting mechanism at each station for lifting a tray from the delivery conveyor and ejecting the lifted tray through the opening corresponding to the station by moving the tray transversely of the conveyor, an operating shaft for the ejecting mechanisms, said shaft extending longitudinally of the conveyor, driving means mounted on the shaft at each station for actuating its ejecting mechanism when the driving means is operatively connected to the shaft, electric means in associated relation with each ejecting mechanism for controlling actuation of the driving means at the respective stations, a timing device for each station for controlling the energization of the electric means at the respective stations, and means driving the operating shaft in synchronism with the spiral screws and at a predetermined speed ratio with respect thereto.

14. Automatic restaurant equipment as defined by claim 13 additionally including driving means for the timing device for operating the same in synchronism with the spiral screws and at a predetermined speed ratio with respect thereto, and wherein the driving means for the operating shaft includes a reciprocating rack operated from the spiral screws and which produces rotation of the operating shaft first in one direction for a complete rotation and then in an opposite direction for a complete rotation.

15. In automatic restaurant equipment, in combination, a delivery conveyor for moving trays in one direction, ejecting mechanism located intermediate the length of the conveyor for ejecting a tray by moving the same transversely of the conveyor, means controlling the operation of said ejecting mechanism, tray despatching means at the start end of the conveyor, timing means for indicating the travel of a tray from the said despatching means to the ejecting mechanism, said timing means having movement coextensive with that of the tray in travelling to the ejecting mechanism, and means for initiating actuation of the tray despatching means and operation of the timing means simultaneously.

16. In automatic restaurant equipment, in combination, a delivery conveyor for moving trays in one direction, ejecting mechanism located intermediate the length of the conveyor for ejecting a tray by moving the same transversely of the conveyor, electric means for causing operation of the ejecting mechanism when energized, tray despatching means at the start end of the conveyor, timing means for indicating the travel of a tray from the said despatching means to the ejecting mechanism, said timing means having movement coextensive with that of the tray in travelling to the ejecting mechanism, electric contact means actuated by said timing means when the same indicates that the tray has reached the ejecting mechanism to cause energization of the said electric means, and means for initiating actuation of the tray despatching means and operation of the timing means simultaneously.

17. In automatic restaurant equipment, in combination, a delivery conveyor for moving trays in one direction, ejecting mechanism located intermediate the length of the conveyor for ejecting a tray by moving the same transversely of the conveyor, electric means for starting operation of the ejecting mechanism when energized, said ejecting mechanism automatically ceasing operation upon the completion of one ejecting operation, tray despatching means at the start end of the conveyor, timing means including a rotatable disc for indicating by rotation thereof the travel of a tray from the said despatching means to the ejecting mechanism, electric contact means actuated by said timing means when the same indicates that a tray has reached the ejecting mechanism to cause energization of the said electric means, and means for initiating actuation of the tray despatching means and operation of the timing means simultaneously.

18. In automatic restaurant equipment, in combination, a delivery conveyor for moving trays in one direction and including a pair of horizontally spaced spiral screws adapted to be rotated at the same speed, ejecting mechanism located intermediate the length of the conveyor for ejecting a tray by moving the same transversely of the conveyor, an operating shaft for driving the ejecting mechanism, electric means for effecting a driving relation between the operating shaft and the ejecting mechanism, said mechanism automatically ceasing operation upon the completion of one ejecting operation, tray despatching means at the start end of the conveyor, timing means including a rotatable disc for indicating by rotation thereof the travel of the tray from the said despatching means to the ejecting mechanism, electric contact means actuated by said timing means when the same indicates that a tray has reached the ejecting mechanism to cause energization of the said electric means, means for driving said operating shaft at a predetermined speed ratio with respect to the spiral screws, and other means for driving the timing means at a predetermined speed ratio with respect to the spiral screws.

19. In automatic restaurant equipment, in combination, a delivery conveyor for moving trays in one direction from the start end of the conveyor to the opposite end, said conveyor including a pair of horizontally spaced spiral screws having the same pitch and adapted to be rotated at the same speed, a housing for the conveyor having a plurality of openings along the length of the conveyor providing stations, ejecting mechanism located at each station for ejecting a tray by moving the same transversely of the conveyor and through the opening at the station, means in associated relation with each ejecting mechanism for controlling operation thereof, tray despatching means at the start end of the conveyor, timing means for each station respectively for indicating the travel of the tray from said despatching means to each of said stations, and electric means for initiating actuation of the tray despatching means and operation of the timing means simultaneously.

20. In automatic restaurant equipment, in combination, a delivery conveyor for moving trays in one direction from the start end of the conveyor to the opposite end, said conveyor including a pair of horizontally spaced spiral screws having the same pitch and adapted to be rotated at the same speed, a housing for the conveyor having a plurality of openings along the length of the conveyor providing stations, ejecting mechanism located at each station for ejecting a tray by moving the same transversely of the conveyor and through the opening at the station, electric means at each station for starting operation of the ejecting mechanism at its station when energized, tray despatching means at the start end of the conveyor, timing means for each station including a rotatable disc for indicating by rotation thereof the travel of the tray from the said despatching means to its particular station, electric contact means having associated relation with each said timing means and adapted to be actuated thereby when the timing means indicates that a tray has reached its station to cause energization of its respective electric means, and means for initiating actuation of the tray despatching means and operation of the timing means simultaneously.

21. In automatic restaurant equipment, in combination, a delivery conveyor for moving trays in one direction from the start end of the conveyor to the opposite end, said conveyor including a pair of horizontally spaced spiral screws having the same pitch and adapted to be rotated at the same speed, a housing for the conveyor having a plurality of openings along the length of the conveyor providing stations, ejecting mechanism located at each station for ejecting a tray by moving the same transversely of the conveyor and through the opening at the station, an operating shaft for driving the ejecting mechanisms, electric means at each station for effecting a driving relation between the operating shaft and its ejecting mechanism, each mechanism automatically ceasing operation upon the completion of one ejecting operation, tray despatching means at the start end of the conveyor, timing means for each station including a rotatable disc for indicating by rotation thereof the travel of a tray from the said despatching means to its respective station, electric contact means having associated relation with each said timing means and adapted to be actuated thereby when the timing means indicates that a tray has reached its station to cause energization of its respective electric means, means for driving said operating shaft at a predetermined speed ratio with respect to the spiral screws, and electric means for initiating actuation of the tray despatching means and operation of the timing means simultaneously.

ROY LANE TRIMBLE.

REFERENCES CITED

The following references are of record in the file of this patent:

UNITED STATES PATENTS

| Number | Name | Date |
| --- | --- | --- |
| 1,147,831 | Vary | July 27, 1915 |
| 1,330,639 | Leumann | Feb. 10, 1920 |
| 1,564,926 | Armstrong | Dec. 8, 1925 |
| 1,826,853 | Williams | Oct. 13, 1931 |
| 1,881,898 | Olson | Oct. 11, 1932 |
| 1,904,198 | Brand | Apr. 18, 1933 |
| 1,938,577 | Brand | Dec. 12, 1933 |
| 1,988,936 | Brand | Jan. 22, 1935 |